United States Patent [19]

Nishihara et al.

[11] Patent Number: 5,747,686
[45] Date of Patent: May 5, 1998

[54] TIRE PRESSURE-REDUCTION DETERMINING SYSTEM FOR WHEELS OF A VEHICLE

[75] Inventors: Takashi Nishihara; Shuji Shiraishi; Osamu Yamamoto, all of Saitama; Osamu Yano, Tochigi, all of Japan

[73] Assignee: Honda Giken Kogyo Kabushiki Kaisha, Tokyo, Japan

[21] Appl. No.: 729,235

[22] Filed: Oct. 9, 1996

[30] Foreign Application Priority Data

Oct. 11, 1995 [JP] Japan .................... 7-262684

[51] Int. Cl.$^6$ .................... B60C 23/00; F02D 29/02
[52] U.S. Cl. .................... 73/146.2; 340/444
[58] Field of Search .................... 73/146, 146.2; 340/442, 443, 444; 364/424.03, 426.02, 558, 565

[56] References Cited

U.S. PATENT DOCUMENTS

| | | | |
|---|---|---|---|
| 5,327,346 | 7/1994 | Goodell | 364/426.02 |
| 5,343,741 | 9/1994 | Nishihara et al. | 73/146.2 |
| 5,561,415 | 10/1996 | Dieckmann | 73/146.2 |
| 5,583,483 | 12/1996 | Baumann | 340/444 |

FOREIGN PATENT DOCUMENTS

| | | |
|---|---|---|
| A-0497120 | 8/1992 | European Pat. Off. |
| A-0646481 | 4/1995 | European Pat. Off. |
| A-4400913 | 7/1995 | Germany |

*Primary Examiner*—William L. Oen
*Attorney, Agent, or Firm*—Armstrong, Westerman, Hattori, McLeland & Naughton

[57] ABSTRACT

A reduction in pressure in tires fitted to follower wheels and driven wheels is precisely determined irrespective of slipping states of the driven wheels. A driven wheel slip rate calculating means M1 calculates driven wheel slip rates $\lambda L$ and $\lambda R$. A driven wheel torque calculating means M2 calculates a driven wheel torque TQDW. A driven wheel slip rate estimating means M4 estimates a characteristic of variation in driven wheel slip rates $\lambda L$ and $\lambda R$ relative to the variation in driven wheel torque TQDW using a least squares method. A rotation-number ratio calculating means M5 calculates ratios CVWL and CVWR of the numbers of rotations of the follower wheels to the numbers of rotations of the driven wheels in a state in which the driven wheel torque in a graph of the variation characteristic is equal to zero. A tire pressure-reduction determining means M6 then determines a reduction in pressure from a difference in diameter between the follower wheels and the driven wheels by comparing the rotation-number ratios CVWL and CVWR with a reference value.

4 Claims, 6 Drawing Sheets

FIG.6 in a transmission M for detecting a shift position SP. Further, a steering angle detecting means 9 is mounted on a steering wheel 8 for detecting steering angle δ.

TIRE PRESSURE-REDUCTION DETERMINING SYSTEM FOR WHEELS OF A VEHICLE

BACKGROUND OF THE INVENTION

1. Field of the Invention

The present invention relates to a tire pressure-reduction determining system for a vehicle for determining a reduction in pressure in a tire based on a difference in diameter between the tires fitted on the follower and driven wheels.

2. Description of the Related Art

A traction control system or an antilock brake system in a vehicle includes rotation-number sensors in the follower and driven wheels to detect follower wheel speeds and driven wheel speeds used for calculation of a slip rate of a wheel or the like. However, if the tire is fitted to any of the wheels reduced in diameter due to a reduction in pressure, the number of rotations of the follower wheels and the driven wheels detected by the rotation-number sensors do not correctly correspond to the follower wheel speeds and the driven wheel speeds.

Therefore, in a conventional system, a difference in diameter between the follower wheels and the driven wheels by comparing the rotation-number ratio between the follower wheels and the driven wheels, and a reduction in tire pressure is detected based on such diameter difference.

However, the above prior art technique suffers from the following problem: If the driven wheel is in a slipping state, the ratio of the number of rotations of the follower wheel to the number of rotations of the driven wheel cannot be correctly determined. Therefore, an error is generated in the difference in diameter between the follower and driven wheels, and the reduction in tire pressure cannot be accurately detected.

SUMMARY OF THE INVENTION

The present invention addresses the afore-mentioned concerns, and it is an object of the present invention to provide a tire pressure-reduction determining system for a vehicle, wherein a reduction in pressure in the tires fitted to the follower wheels and the tires fitted to the driven wheels can be precisely determined irrespective of slipping states of the driven wheels.

To achieve the above object, there is provided a tire pressure-reduction determining system for a vehicle, comprising a driven wheel slip rate calculating means for calculating driven wheel slip rates based on follower wheel speeds and driven wheel speeds, a driven wheel torque calculating means for calculating a driven wheel torque based on an engine torque, a driven wheel slip rate estimating means for estimating a characteristic of variation in driven wheel slip rates relative tot he driven wheel torque based on the driven wheel slip rates and the driven wheel torque, a rotation-number ratio calculating means for calculating rotation-number ratios (CVWL and CVWR) between follower wheels and driven wheels as driven wheel slip rates at the time when the driven wheel torque is zero, from the variation characteristic estimated by the driven wheel slip rate estimating means, and a tire pressure-reduction determining means for determining a reduction in pressure of the tires fitted to the follower wheels and the tires fitted to the driven wheels by comparing the rotation-number ratios calculated by the rotation-number ratio calculating means with a predetermined reference value.

In addition, a reduction in pressure in one of the tires fitted to the left and right follower wheels and one of the tires fitted to the left and right driven wheels is determined by calculating a rotation-number ratio between one of the left and right follower wheels and one of the left and right driven wheels based on one of the left and right follower wheels speeds and one of the driven wheel speeds.

The driven wheel slip rate estimating means obtains data for estimating the variation characteristic of the driven wheel slip rates relative to the driven wheel torque in each of a plurality of torque areas classified depending upon the magnitude of the driven wheel torque, and obtains data in the torque area including a state of the driven wheel torque of zero in an amount greater than the amount of data in the other torque areas.

A driven wheel torque area limiting means for limiting the torque area inputs data for estimating the variation characteristic by the driven wheel slip rate estimating means, in accordance with the friction coefficient of a road surface.

DETAILED DESCRIPTION OF A PREFERRED EMBODIMENT

The present invention will now be described by way of an embodiment with reference to the accompanying drawings.

Figure 1:
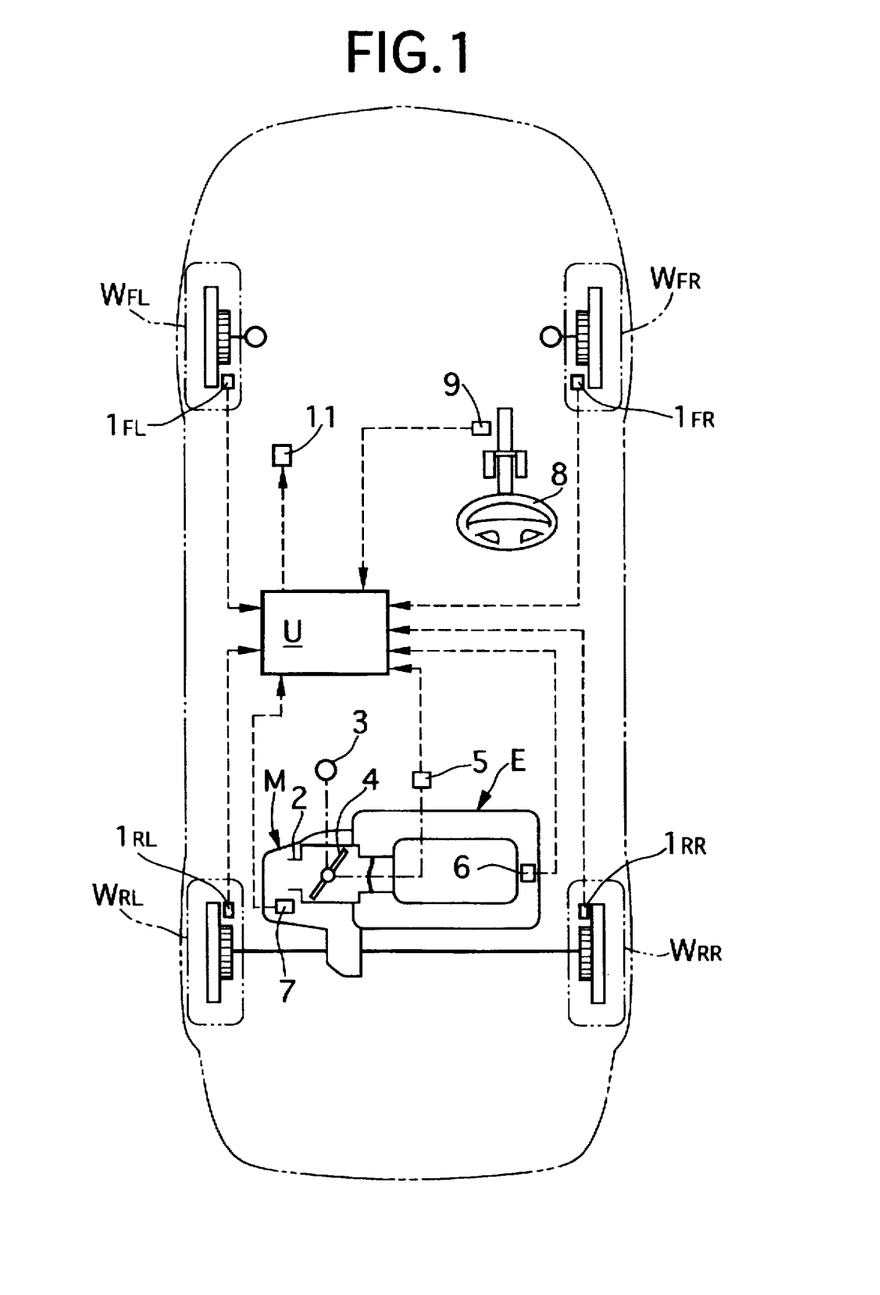
FIG. 1 is a diagrammatic illustration of a vehicle including tire pressure-reduction determining system of the present invention.
Figure 2:
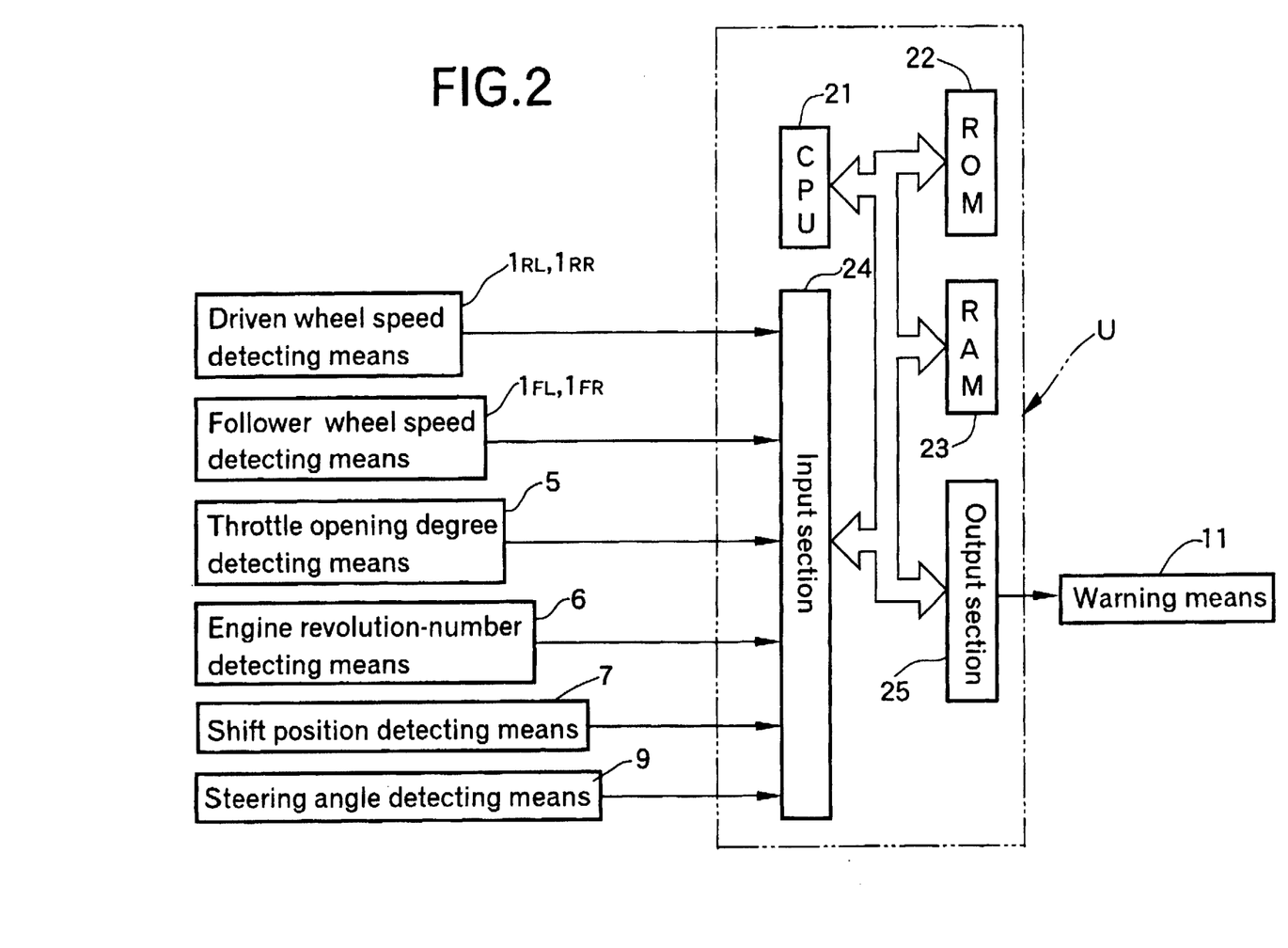
FIG. 2 is a block diagram of a control system.
Figure 3:
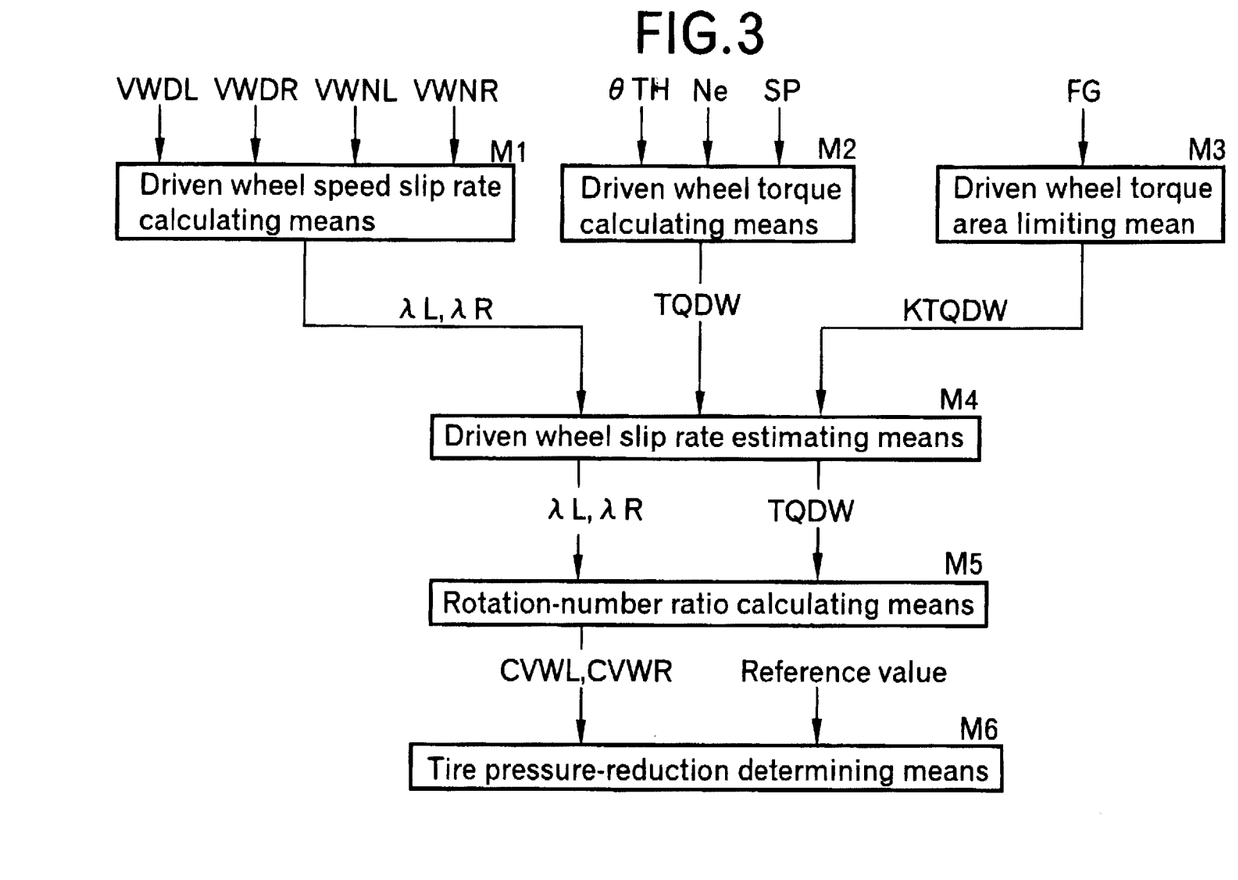
FIG. 3 is a block diagram of the tire pressure-reduction determining system.
Figure 4:
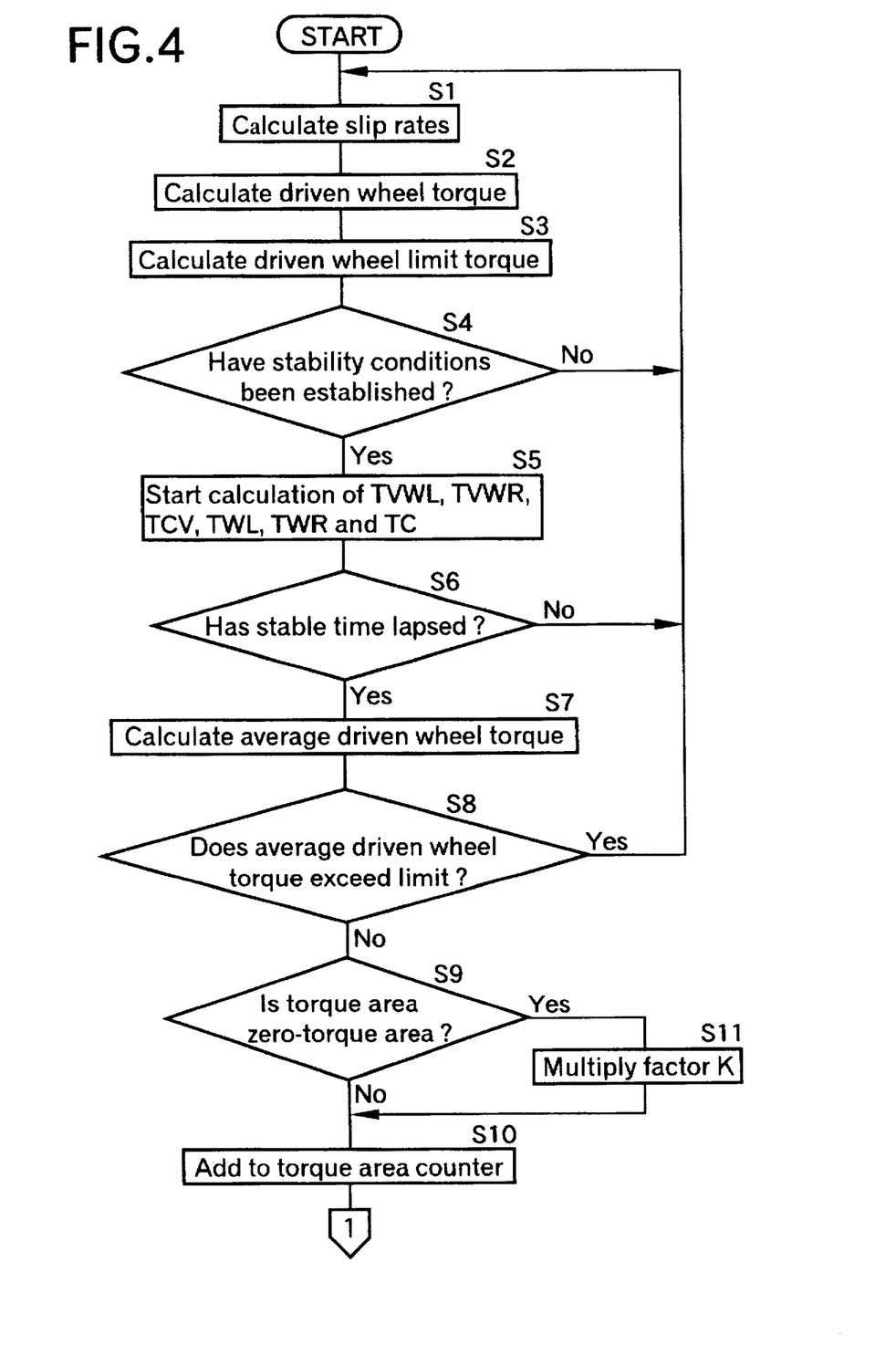
FIG. 4 is a first portion of a flow chart for determining the tire pressure-reduction.
Figure 5:
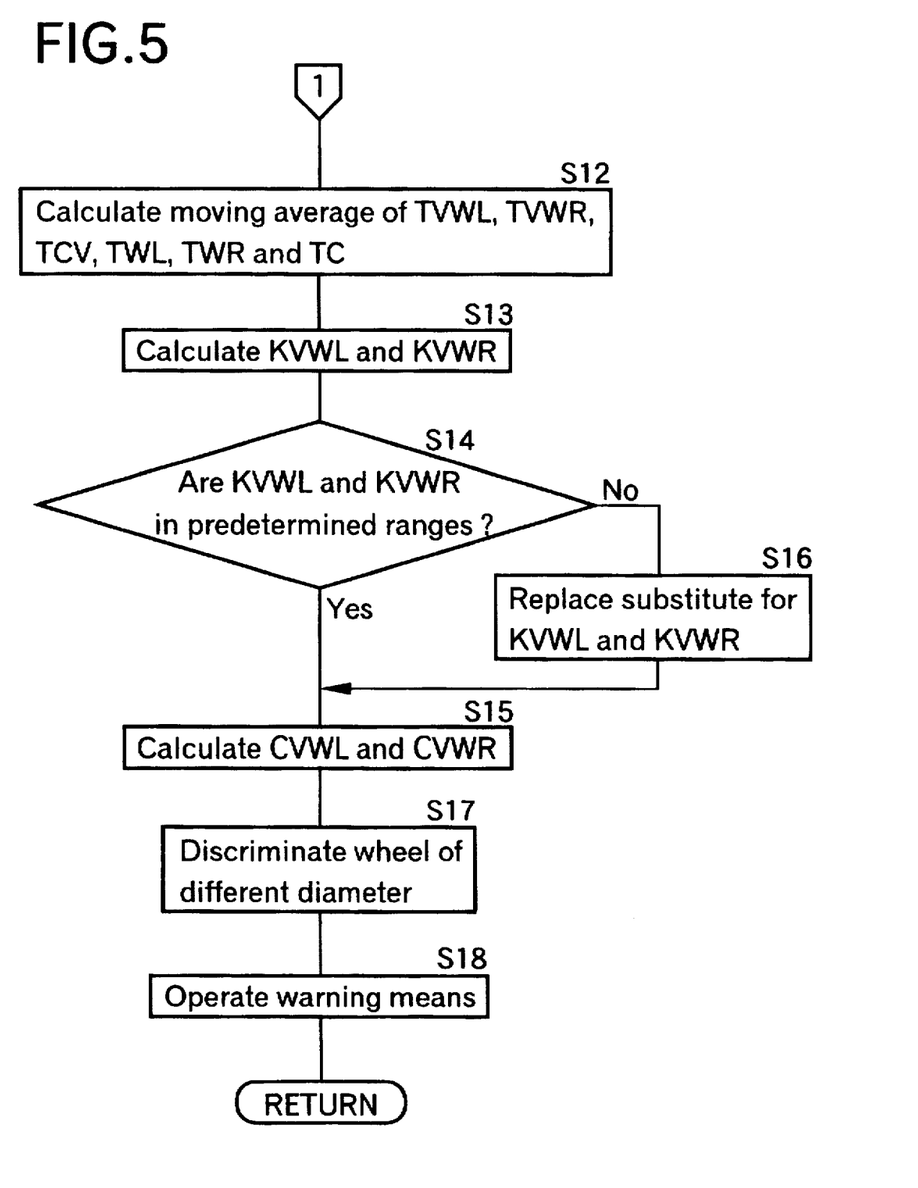
FIG. 5 is a second portion of the flow chart for determining the tire pressure-reduction.
Figure 6:
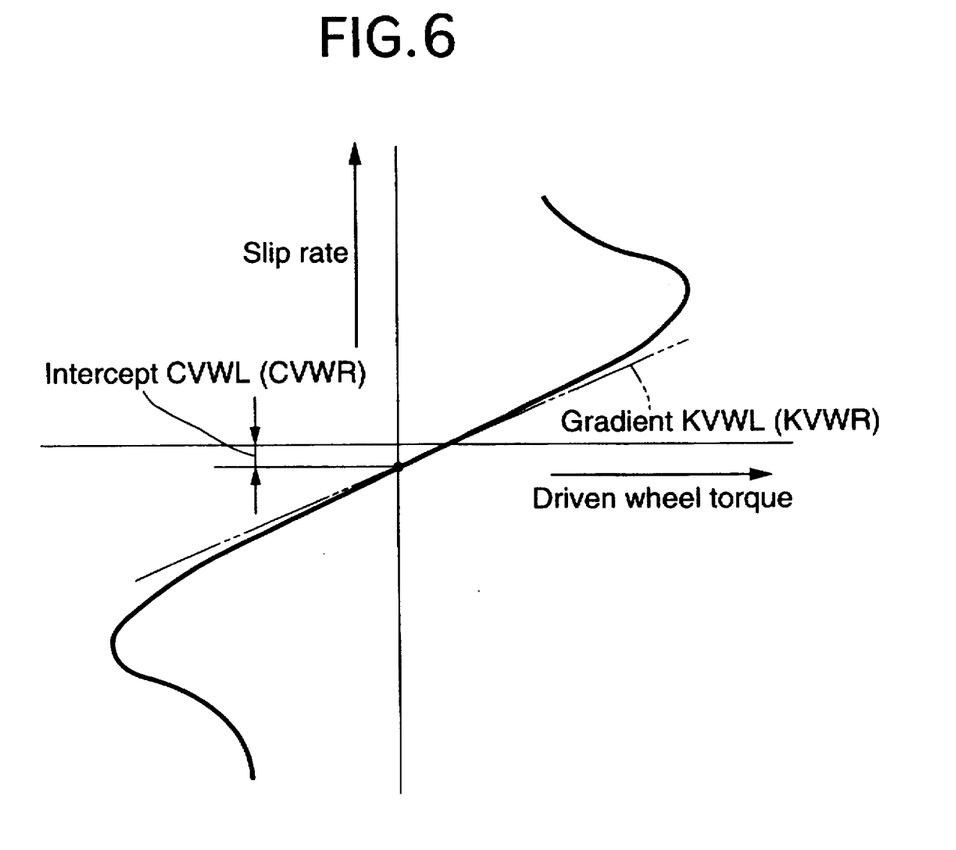
FIG. 6 is a graph illustrating the characteristic of variation in slip rate of driven wheels.

FIGS. 1 to 6 illustrate a preferred embodiment of the present invention, where FIG. 1 is a diagrammatic illustration of a vehicle including a wheel pressure-reduction determining system, FIG. 2 is a block diagram of a control system, FIG. 3 is a block diagram of the tire pressure-reduction determining system, FIG. 4 is a first portion of a flow chart for determining the tire pressure-reduction, FIG. 5 is a second portion of the flow chart for determining the tire pressure-reduction, and FIG. 6 is a graph illustrating the characteristic of variation in slip rate of driven wheels.

As shown in FIG. 1, the vehicle is a rear-wheel drive vehicle and includes a pair of left and right driven wheels $W_{RL}$ and $W_{RR}$ driven by an engine E, and a pair of steerable follower wheels $W_{FL}$ and $W_{FR}$. Driven wheel speed detecting means $1_{RL}$ and $1_{RR}$ are mounted on the driven wheels $W_{RL}$ and $W_{RR}$, and follower wheel speed detecting means $1_{FL}$ and $1_{FR}$ are mounted on the follower wheels $W_{FL}$ and $W_{FR}$.

A throttle valve 4 is mounted in an intake passage 2 in the engine E and connected to and opened and closed by a pulse motor 3. The opening degree ΘTH of the throttle valve 4 is detected by a throttle opening degree detecting means 5. An engine revolution-number detecting means 6 is mounted in the engine E for detecting a number Ne of revolutions of the engine E, and a shift position detecting means 7 is mounted in a transmission M for detecting a shift position SP. Further, a steering angle detecting means 9 is mounted on a steering wheel 8 for detecting steering angle δ.

The driven wheel speed detecting means $1_{RL}$ and $1_{RR}$, the follower wheel speed detecting means $1_{FL}$ and $1_{FR}$, the throttle opening degree detecting means 5, the engine revolution-number detecting means 6, the shift position detecting means 7 and the steering angle detecting means 9 are connected to an electronic control unit U including a microcomputer. Further, a warning means 11 such as a lamp, a buzzer, chime or the like is connected to the electronic control unit U to give a warning when a difference in diameter is generated between tires fitted to the wheels due to a reduction in tire pressure.

FIG. 2 shows the electronic control unit U which calculates signals from the various detecting means according to a control program to operate the warning means 11 in order to give a warning when the reduction in pressure in the tire is generated. The electronic control unit U includes a central processing unit (CPU) 21 for carrying out the calculations, a read-only memory (ROM) 22 having the control program and data such as various maps and the like stored therein, a random access memory (RAM) 23 for temporarily storing the output signals from the various detecting means and the calculation means, an input section 24 to which the various detecting means, i.e., the driven wheel speed detecting means $1_{RL}$ and $1_{RR}$, the follower wheel speed detecting means $1_{FL}$ and $1_{FR}$, the throttle opening degree detecting means 6, the shift position detecting means 7 and the steering angle detecting means are connected, and an output section 25 to which the warning means 11 is connected. Thus, the electronic control unit U calculates the various signals inputted through the input section and the data stored in the read-only memory 22 in the central processing unit 21 according to the control program which will be described hereinafter, and finally operates the warning means 11 through the output section 25.

As shown in FIG. 3, the tire pressure-reduction determining system includes a driven wheel slip rate calculating means M1, a driven wheel torque calculating means M2, a driven wheel torque area limiting means M3, a driven wheel slip rate estimating means M4, a rotation-number ration calculating means M5, and a tire pressure-reduction determining means M6.

The driven wheel slip rate calculating means M1 calculates slip rates λL and λR of the left and right driven wheels based on driven wheel speeds VWDL and VWDR detected by the driven wheel speed detecting means $1_{RL}$ and $1_{RR}$ and follower wheel speeds VWNL and VWNR detected by the follower wheel speed detecting means $1_{FL}$ and $1_{FR}$. The driven wheel torque calculating means M2 calculates a driven wheel torque TQDW based on the throttle opening degree ΘTH detected by the throttle opening degree detecting means 5, the engine revolution-number Ne detected by the engine revolution-number detecting means 6 and the shift position SP detected by the shift position detecting means 7. The driven wheel torque area limiting means M3 calculates a driven wheel limit torque KTQDW depending upon the friction coefficient of a road surface based on a longitudinal acceleration FG of the vehicle.

The driven wheel slip rate estimating means M4 presumes a characteristic of variation in driven wheel slip rates λL and λR relative to the driven wheel torque TQDW, based on the driven wheel slip rates λL and λR, the driven wheel torque TQDW and the driven wheel limit torque KTQDW. The rotation-number ratio calculating means M5 calculates rotation-number ratios CVWL and CVWR between the follower wheels $W_{FL}$ and $W_{FR}$ and the driven wheels $W_{RL}$ and $W_{RR}$, based on the characteristic of variation in driven wheel slip rates λL and λR relative to the driven wheel torque TQDW. The tire pressure-reduction determining means M6 determines reductions in pressure in the tires fitted to the follower wheels $W_{FL}$ and $W_{FR}$ and the tires fitted to the driven wheels $W_{RL}$ and $W_{RR}$ by comparing the rotation-number ratios CVWL and CVWR between the follower wheels $W_{FL}$ and $W_{FR}$ and the driven wheels $W_{RL}$ and $W_{RR}$ with a predetermined reference value.

The operation of the embodiment of the present invention having the above-described arrangement will be described below with reference to the flow chart shown in FIGS. 4 and 5.

First, in the driven wheel slip rate calculating means M1, a slip rate λL (λL=(VWDL−VWNL)/VWNL) of the left driven wheel $W_{RL}$ is calculated based on the left driven wheel speed VWDL and the left follower wheel speed VWNL, and a slip rate λR (λR=(VWDR−VWNR)/VWNR) of the right driven wheel $W_{RR}$ is calculated based on the right driven wheel speed VWDR and the right follower wheel speed VWNR (at step S1).

Then, in the driven wheel torque calculating means M2, an engine torque is calculated from the opening degree ΘTH of the throttle valve 4 detected by the throttle opening degree detecting means 5 and the engine revolution-number Ne detected by the engine revolution-number detecting means 6, and a driven wheel torque TQDW is calculated by multiplying a primary filtered value of the engine torque by a gear ratio in the shift position SP detected by the shift position detecting means 7 (at step S2). The driven wheel torque TQDW may assume a negative value, for example, during operation of an engine brake.

Subsequently, in the driven wheel torque area limiting means M3, a driven wheel limit torque KTQDW (KTQDE= FG×Wt×DLR) is calculated based on a longitudinal acceleration FG of the vehicle calculated based on the driven wheel torque TQDW, or a longitudinal acceleration FG of the vehicle detected by a longitudinal acceleration sensor (not shown), a driven wheel axle load Wt and a driven wheel dynamic load radius DLR (at step S3). The driven wheel limit torque KTQDW is a value which varies depending upon the friction coefficient μ of the road surface. The value is smaller on a road surface having a lower friction coefficient μ and larger on a road surface having a higher friction coefficient μ.

Then, in the driven wheel slip rate estimating means M4, it is determined whether stability conditions for carrying out the determination of the reduction in pressure of the wheel have been established (at step S5). More specifically, it is determined whether any of the four wheel speeds VWDL, VWDR, VWNL and VWNR are in predetermined ranges; whether the amounts of variation in driven wheel speeds VWDL and VWDR and in follower wheel speeds VWNL and VWNR within a predetermined time are in predetermined ranges; whether the longitudinal acceleration and the lateral acceleration are in predetermined ranges; whether the number Ne of revolutions of the engine is in a predetermined range; whether the driven wheel torque TQDW is in a predetermined range; whether the variation rate of the steering angle δ is in a predetermined range; whether the vehicle is not being braked; whether the vehicle is not being subjected to a traction control; whether the transmission is not being shift-changed; whether the travelling of the vehicle is not on a bad road; whether the difference between the left and right driven wheel speeds VWDL and VWDR and the difference between the left and right follower wheel speeds VWNL and VWNR are in predetermined ranges; and whether the amounts of variation in yaw rate and vehicle speed within a predetermined time are in predetermined ranges. If all of these conditions have been established, it is determined that the vehicle is in a stable travel state, and the determination of the reduction in pressure of the tire is carried out.

Then, the driven wheel torque TQDW and the left and right driven wheel slip rates λL and λR calculated in every loop are added in sequence until a lapse of a stable time (a time for which an n-loop is carried out) according to the following equations (1) to (4) to calculate six addition values TVWL, TVWR, TCV, TWL, TWR and TC (at steps S5 and S6):

$$TVWL(n)=TQDW(1)\times\lambda L(1)+TQDW(2)\times\lambda L(2)+\ldots+TQDW(n)\times \lambda L(n) \quad (1)$$

$$TVWR(n)=TQDW(1)\times\lambda R(1)+TQDW(2)\times\lambda R(2)+\ldots+TQDW(n)\times \lambda R(n) \quad (2)$$

$$TCV(n)=TQDW(1)^2+TQDW(2)^2+\ldots+TQDW(n) \quad (3)$$

$$TWL(n)=\lambda L(1)+\lambda L(2)+\ldots+\lambda L(n) \quad (4)$$

$$TWL(n)=\lambda R(1)+\lambda R(2)+\ldots+\lambda R(n) \quad (5)$$

$$TC(n)=TQDW(1)+TQDW(2)+\ldots+TQDW(n) \quad (6)$$

Then, the addition value TC of the driven wheel torque TQDW calculated according to the equation (6) is divided by n to calculate an average value of the driven wheel torques (at step S7).

Subsequently, the average value of the driven wheel torques TQDW calculated at step S7 is compared with the driven wheel limit torque KTQDW calculated at step S3. If the average value of the driven wheel torques TQDW does not exceed the driven wheel limit torque KTQDW, i.e., when the torque area is an area in which a linearity is maintained in the relationship between the driven wheel torque and the driven wheel slip rate, the processings at step S10 and subsequent steps are carried out (at step S8). Thus, it is possible to correctly presume the characteristic of variation in driven wheel slip rates λL and λR relative to the variation in driven wheel torque TQDW, which will be described hereinafter.

The average value of the driven wheel torques TQDW is classified into, for example, eight (1), (2), (3), (4), (5), (6), (7) and (8). The area (1) is a minimum torque area (a negative value); the area (8) is a maximum torque are (a positive value); and the area (3) is a zero-torque area (a torque area in which the driven wheel torque is near zero). The eight torque areas (1) to (8) are established in correspondence to the left driven wheel $W_{RL}$ and $W_{RL}$, respectively. Corresponding counters are provided in the eight torque areas (1) to (8), respectively.

Then, if the average value of the driven wheel torques TQDW calculated at step S7 has not fallen into the zero-torque area (3), 1 which is a maximum value is added to the counter in the torque area (1), (2), (3), (4), (5), (6), (7) or (8) into which such average value has fallen (at steps S9 and S10). On the other hand, if the average value of the driven wheel torques TQDW calculated at step S7 has fallen into the zero-torque area (3), a factor K (K<1) is added to the counter in the zero-torque area (3). For example, if K=0.1, 0.1 is added to the counter in the zero-torque area (3) (at steps S11 and S12).

Subsequently, a moving average of the six addition values TVWL, TVWR, TCV TWL, TWR and TC is calculated according to the following equation (7) (at step S12):

$$T?(m)=(1/m)\times T?+(m-1/m)\times T?(m-1) \quad (7)$$

wherein T?=TVWL, TVWR, TCV, TWL, TWR or TC.

Thus, the moving average of the four addition values TVWL, TVWR, TCV TWL, TWR and TC is calculated for each of the eight torque areas (1) to (8). However, if the value of the counter in each of the torque areas (1) to (8) assumed 1 which is the maximum value at that time, the calculation of the six addition values TVWL, TVWR, TCV TWL, TWR and TC and the moving average of them in each of the torque areas (1) to (8) is discontinued. In other words, in each of the torque areas (1), (2), (4), (5), (7) and (8) other than the zero-torque area (3), a run of gaining of data for a stable time is carried out, and in the zero-torque area (3), a plurality of runs of gaining of data for the stable time depending upon the factor K (for example, if K=0.1, 10 runs) are carried out.

Then, in the rotation-number ratio calculating means M5, a gradient KVWL is calculated from an equation (8) based on the moving average of the four addition values TVWL, TCV, TWL and TC, and a gradient KVWR is calculated from an equation (9) based on the moving average of the four addition values TVWL, TCV, TWR and TC (at step S13).

$$KVWL=\{n\times TVWL-TWL\times TC\}/\{n\times TCV-TC^2\} \quad (8)$$

$$KVWR=\{n\times TVWR-TWR\times TC\}/\{n\times TCV-TC^2\} \quad (9)$$

Thus, if a characteristic curve providing a relation, appearing to be most definite, of the variation in driven wheel slip rates λL and λR to the variation in driven wheel torque TQDW is estimated using a least squares method (see FIG. 6), the gradient KVWL obtained from the equation (6) corresponds to a gradient when the driven wheel torque TQDW in the characteristic curve of the left front and rear wheels $W_{FL}$ and $W_{RL}$ is equal to 0 (zero), and the gradient KVWR obtained from the equation (9) corresponds to a gradient when the driven wheel torque TQDW in the characteristic curve of the right front and rear wheels $W_{FR}$ and $W_{RR}$ is equal to 0 (zero).

When the gradients KVWL and KVWR are in predetermined ranges, by using such gradients KVWL and KVWR, and when the gradients KVWL and KVWR are out of the predetermined ranges, by using substitute values as KVWL and KVWR, intercepts CVWL and CVWR corresponding to an intercept on the axis of ordinates in the characteristic curve in FIG. 6 are calculated according to the following equations (10) and (11) (at steps S14 to S16).

$$CVWL=(TWL-KVWL\times TC)/n \quad (10)$$

$$CVWR=(TWR-KVWR\times TC)/n \quad (11)$$

The intercept CVWL represents a ratio of the number of rotations of the left follower wheel $W_{FL}$ to the number of rotations of the left driven wheel $W_{RL}$ when the left driven wheel $W_{RL}$ is not in a slipping state, and the intercept CVWR represents a ratio of the number of rotations of the right follower wheel $W_{FR}$ to the number of rotations of the right driven wheel $W_{RR}$ when the right driven wheel $W_{RR}$ is not in a slipping state.

Then, a difference between the intercept CVWL and a stored referenced value determined by learning, or a difference between the intercept CVWL and a previously set reference value is calculated. If such difference is greater than predetermined threshold value, it is determined that a reduction in diameter due to a reduction in the pressure has been produced in the left driven wheel $W_{RL}$ or the left follower wheel $W_{FL}$ (at step S17), and the warning means 11 is operated to give a warning to a driver (at step S18). At this time, it can be determined which of the left driven wheel $W_{RL}$ or the left follower wheel $W_{FL}$ has been reduced in diameter, based on the magnitude of the relationship between the intercept CVWL and the reference value.

Likewise, a difference between the intercept CVWR and a reference value is calculated. If such difference is greater than a predetermined threshold value, it is determined that a reduction in diameter has been produced in the right driven wheel $W_{RR}$ or the right follower wheel $W_{FR}$, and the warning means 11 is operated (at steps S17 and S18). At this time, it can be determined which of the right driven wheel $W_{RR}$ or the right follower wheel $W_{FR}$ has been reduced in diameter, based on the magnitude of the relationship between the intercept CVWR and the reference value.

In this manner, the driven wheel slip rates λL and λR at the time when the driven wheel torque is extremely small, are estimated, and the ratios CVWL and CVWR of the numbers of rotations of the follower wheels $W_{FL}$ and $W_{RR}$ to the numbers of rotations of the driven wheels $W_{FL}$ and $W_{RR}$ are calculated based on the driven wheel slip rates λL and λR. Therefore, a reduction in pressure of the tires fitted to the follower wheels $W_{FL}$ and $W_{FR}$ and the tires fitted to the driven wheels $W_{RL}$ and $W_{RR}$ can be accurately determined while eliminating an influence of the slips of the driven wheels $W_{RL}$ and $W_{RR}$.

Moreover, the ratio CVWL of the number of rotations of the left follower wheels $W_{FL}$ to the number of rotations of the left driven wheels $W_{RL}$ and the ratio CVWR of the number of rotations of the right follower wheels $W_{FR}$ to the number of rotations of the right driven wheels $W_{RR}$ are individually calculated. Therefore, it is possible not only to determine the reduction in diameter of the follower wheels $W_{FL}$ and $W_{FR}$ or the reduction in diameter of the driven wheel $W_{RL}$ and $W_{RR}$, but also to accurately determine which of the left and right follower wheels $W_{FL}$ and $W_{FR}$ has been reduced in diameter, or which of the left and right driven wheels $W_{RL}$ and $W_{RR}$ has been reduced in diameter.

Although the embodiment of the present invention has been described in detail, it will be understood that the present invention is not limited to the above-described embodiment, and various modifications may be made without departing from the subject matter and scope of the invention defined in claims.

For example, the ratio CVWL of the number of rotations of the left follower wheels $W_{FL}$ to the number of rotations of the left driven wheels $W_{RL}$ and the ratio CVWR of the number of rotations of the right follower wheels $W_{FR}$ to the number of rotations of the right driven wheels $W_{RR}$ are individually calculated in the embodiment. However, the ratios CVWL and CVWR of the numbers of rotations of the follower wheels $W_{FL}$ and $W_{FR}$ to the numbers of rotations of the driven wheels $W_{RL}$ and $W_{RR}$ may be calculated using an average value of the left and right follower wheel speeds VWNL and VWNR as a follower wheel speed and using an average value of the left and right driven wheel speeds VWDL and VWDR. In this case, the reduction in wheel diameter cannot be determined in a wheel-specifying manner, but it can be determined that a reduction in diameter has been produced in the follower wheels $W_{FL}$ and $W_{FR}$, or that a reduction in diameter has been produced in the driven wheels $W_{RL}$ and $W_{RR}$.

We claim:

1. A tire pressure-reduction determining system for wheels of a vehicle, comprising:

a driven wheel slip rate calculating means (M1) for calculating driven wheel slip rates (λL and λR) based on follower wheels speeds (VWNL and VWNR) and driven wheel speeds (VWDL and VWDR);

a driven wheel torque calculating means (M2) for calculating a driven wheel torque (TQDW) based on an engine torque;

a driven wheel slip rate estimating means (M4) for estimating a characteristic variation in driven wheel slip rates (λL and λR) relative to the driven wheel torque (TQDW) based on the driven wheel slip rates (λL and λR) and the driven wheel torque (TQDW);

a rotation-number ratio calculating means (M5) for calculating rotation-number ratios (CVWL and CVWR) between follower wheels ($W_{FL}$ and $W_{FR}$) and driven wheels ($W_{RL}$ and $W_{RR}$) said driven wheel slip rates (λL and λR) at the time when the driven wheel torque is zero, from said variation characteristic estimated by said driven wheel slip rate estimating means (M4); and a tire pressure-reduction determining means for determining a reduction in pressure of tires fitted to the follower wheels ($W_{FL}$ and $W_{FR}$) and tires fitted to the driven wheel ($W_{RL}$ and $W_{RR}$) by comparing the rotation-number ratios (CVWL and CVWR) calculated by said rotation-number ratio calculating means (M5) with a predetermined reference value.

2. A tire pressure-reduction determining system for wheels of a vehicle according to claim 1, wherein a reduction in pressure in one of the tires fitted to the left and right follower wheels ($W_{FL}$ and $W_{FR}$) and one of the tires fitted to the left and right driven wheels ($W_{RL}$ and $W_{RR}$) is determined by calculating a rotation-number ratio (CVWL, CVWR) between one of the left and right follower wheels ($W_{FL}$ and $W_{FR}$) and one of the left and right driven wheels ($W_{RL}$ and $W_{RR}$) an one of the left and right driven wheels ($W_{RL}$ and $W_{RR}$) based on one of the left and right follower wheel speeds (VWNL and VWNR) and one of the driven wheel speeds (VWDL and VWDR).

3. A tire pressure-reduction determining system for wheels of a vehicle according to claim 1, wherein said driven wheel slip rate estimating means M4 obtains data for estimating said variation characteristic of the driven wheel slip rates (λL and λR) relative to the driven wheel torque (TQDW) in each of a plurality of torque areas classified depending upon the magnitude of the driven wheel torque (TQDW), and obtains data in the torque areas including a state where the driven wheel torque is zero in an amount greater than the amount of data in the other torque areas.

4. A tire pressure-reduction determining system for wheels of a vehicle according to claim 1, further comprising a driven wheel torque area limiting means (M3) for limiting the torque area which inputs data for estimating said variation characteristic by said driven wheel slip rate estimating means (M4), in accordance with a friction coefficient of a road surface.

* * * * *